United States Patent [19]
Seki et al.

[11] Patent Number: 5,867,168
[45] Date of Patent: Feb. 2, 1999

[54] METHOD OF DRAWING A CUBIC VIEW USING A MINOR AND A MAJOR AXIS OF AN ELLIPSE

[75] Inventors: Nobuhiro Seki; Yoshiyuki Otsuka, both of Osaka, Japan

[73] Assignee: International Technical Publication Co., Ltd., Osaka, Japan

[21] Appl. No.: 675,962

[22] Filed: Jul. 5, 1996

[30] Foreign Application Priority Data

Jul. 5, 1995 [JP] Japan ..................................... 7-169721

[51] Int. Cl.$^6$ .................................................. G06T 17/40
[52] U.S. Cl. .......................................................... 345/427
[58] Field of Search ..................................... 345/126, 437, 345/427; 364/474.22, 474.24, 474.36

[56] References Cited

U.S. PATENT DOCUMENTS

| | | | |
|---|---|---|---|
| 5,019,809 | 5/1991 | Chen | 340/815.31 |
| 5,067,167 | 11/1991 | Berger | 382/82 |
| 5,115,494 | 5/1992 | Seki | 395/127 |

*Primary Examiner*—Mark K. Zimmerman
*Assistant Examiner*—Alford W. Kindred
*Attorney, Agent, or Firm*—Edwin E. Greigg; Ronald E. Greigg

[57] ABSTRACT

The method of drawing a cubic view, and more particularly to a method of drawing a cubic view by using data of plan views. First, displaying three model projection planes 1 for composing a cubic view on the display, and designating the plan view to be projected, the plane standard point and direction on the designated plate are specified. Then, the specific surface of the model projection plane and the direction on the model projection plane are designated. Finally, the display standard point is designated at an arbitrary position on the display. Accordingly, operating parameters shown in FIG. 1 overlaps the system of coordinates of 45° rotation of the plan view on the system of coordinates of the major axis and minor axis of the ellipse on the projection plane, and obtains a projection view by multiplying by the ratio a/b of the major axis (a) and minor axis (b) in the major axis direction and minor axis direction, and this obtained projection view is matched with the plane standard point on the plan view at the display standard point, and the cubic view is displayed so that the direction on the plan view may coincide with the direction of the model projection plane.

4 Claims, 11 Drawing Sheets

METHOD OF DRAWING A CUBIC VIEW USING A MINOR AND A MAJOR AXIS OF AN ELLIPSE

TECHNICAL FIELD OF THE INVENTION

The present invention relates to a method of drawing a cubic view, and more particularly to a method of drawing a cubic view by using data of a plan view.

FIG. 12 shows an example of a prior art CAD system. This kind of system basically possesses the following functions for drawing a straight line, a circle, an ellipse, etc.

(a) Straight line
I: Indicates the start point and end point of a desired straight line by a mouse 12 and a cursor.
II: Indicates the start point of a desired straight line, and enters the angle and length from an operation board 11.

(b) Circle
I: Indicates the center point by the mouse 12 and the cursor, and enters the radius from the operation board 11.
II: Indicates two points corresponding to the diameter by the mouse 12 and the cursor.

(c) Ellipse
I: Indicates the center point by the mouse 12 and the cursor, and enters the direction of the major axis, length of the major axis, and length of the minor axis.

Moreover, this CAD system can move and copy drawn graphic elements or a figure drawn by combining these graphic elements.

(d) Move
I: Indicates the move object figure and move source standard point, and indicates the move destination standard point. As a result, the figure or graphic element moves to the move destination standard point.
II: Indicates the move object figure and moving direction (indicates a straight line), and enters the moving distance.

(e) Copy
The operating procedure is exactly the same as in the move, except that the original figure remains at the original position.

Moreover, the present applicant proposed, in U.S. Pat. No. 5,115,494 (Japanese Patent No. 1883355), a method of displaying model projection planes (for example, standard numeral 1 in FIG. 1) drawing standard direction and standard length of a cubic view and ellipses of standard size on each projection plane for composing the cubic view, and drawing the cubic view through the medium of the model projection planes. That is, displaying three model projection planes in a displaying apparatus, when drawing a line segment in the standard direction, first the start point of the segment is designated, and any one of standard axes (x-axis, y-axis, z-axis) is designated in the procedure of direction designation. Then the length is entered. When drawing an ellipse, the center point of the ellipse is designated, and the ellipse drawn on a specific plane of the model projection plane is designated, and the diameter of the circle on the plan view to be projected is entered from the operation board. In this way, the ellipse corresponding to the diameter of the circle in which the designated direction (for example, direction of the standard line) is the basis of the ellipse can be drawn. Each standard axis of the model projection plane shown in FIG. 1 is drawn in the isometric direction, and hence the ellipse has also the isometric direction and the ratio of a major axis and a minor axis.

This CAD system can draw a cubic view on the basis of the data of plan views stored in the memory means. FIG. 11 and FIG. 12 are flow diagrams showing the procedure. First, as shown in a schematic diagram in FIG. 10(a), the top view, bottom view, front view, back view, right side view, and left side view are drawn in individual views, and the position of the plan view drawn in each view is designated. From this state, consequently, the correspondence between each side of the plan view and each projection plane of the cubic view to be drawn is related.

That is, as shown in FIG. 10(a), when the top view PV, front view B, rear view A, right side view R, left side view L, and bottom view C are drawn in each view, the menu screen displays "right side, left side/front, rear/top, bottom." In response, the operator selects either right or left side, either front or rear, either top or bottom, and selects any one of the combinations in FIG. 10(b). Herein, only the menu of "right side, left side/front, rear/top, bottom" is displayed, but the die-shaped figure shown in FIG. 10(b) is not displayed.

The upper line examples in FIG. 10(b) are initially set so that the top surface may be disposed on the top surface of the cubic view (in the lower line examples, the bottom surface corresponds to the bottom surface on the cubic view), but it is also possible to designate otherwise for disposing other surface than the top surface (bottom surface) in the top surface (bottom surface) of the cubic view.

FIG. 11(a) shows an example of drawing individual views in a practical drawing, and according to this drawing, hereinafter, the procedure of drawing a cubic view in the prior art is described.

As shown in FIG. 11(b), origin Pa on the plan view is designated by the system of coordinates of the plan view (in this case, the front view), and display origin Pb is designated, and it is so set that the origin Pa on the plan view may be positioned on the display origin Pb when a projection drawing corresponding to the plan view is drawn. Afterwards, the scale and other necessary items are entered.

In consequence, as indicated by a thick line in FIG. 12(b), designating elements to be projected (straight line, circle), or a set of elements, a section line La drawn in another view corresponding to the surface is designated. As a result, the projection plane is displayed so that the plane standard point Pa on the plan view may coincide with the display standard point Pb. Further, as indicated by thick line in FIG. 12(c), designating other elements to be projected or a set of elements, section line Lb is designated. Still more, when drawing the right side upper left part M in a cubic view, the elements for composing the portion are designated as shown in FIG. 12(b), and section Lc is designated. By sequentially repeating in this procedure, a cubic view is drawn.

In the conventional method, it is necessary to clarify the corresponding relation of elements appearing on each plan view, and the views must be prepared by disposing each drawing composing the plan view at specified position, and at this time it is not permitted to dispose each drawing in other place than the specified position.

To determine the corresponding relation of each drawing of plan view and each surface for composing the cubic view, it cannot be judged visually on the screen, and the description of the manual shown in FIG. 10(b) is indispensable.

The invention is devised in the light of the above conventional background, and it is hence an object thereof to present a method of drawing a cubic figure easily by manipulation on the screen only without having to prepare views.

SUMMARY OF THE INVENTION

When drawing a cubic view on the basis of the data of a plan view, as shown in FIG. 9, the system of coordinates v, w by 45° rotation (FIG. 9(b), origin Pa) of the plan view to be projected is overlapped with the system of coordinates u, w of a major axis and minor axis (FIG. 9(c), origin P0) of the ellipse drawn in a specific plane in the projection plane (X plane, Y plane, Z plane shown in FIG. 9(a)) for composing the cubic view (FIG. 9(d)), and the plan view is multiplied by the ratio a/b of the major axis and minor axis in the major axis direction and minor axis direction (FIG. 9(d) to (e)). For the ease of understanding, in FIG. 9, these two systems of coordinates are displayed so as to be matched in the origin, but in this invention, as described later, the projection plane obtained by calculation is designed so that the display standard point P10 designated separately may coincide with the plane standard point on the plan view, for example, the origin of the coordinates (origin Pa).

Conforming to such basic principle, in this invention, the model projection drawing is used as described below.

That is, in the first place, three model projection planes 1 for composing a cubic view are shown on the display. In this display method, as shown in FIG. 1 or FIG. 2, three model projection planes 1 are combined like a die, so that the operator can easily imagine the projected cubic view.

Next, designating the plan view to be projected, the plane standard point and direction on the designated plate are specified. Then, the specific surface of the model projection plane and the direction on the model projection plane are designated. Finally, the display standard point is designated at an arbitrary position on the display.

Accordingly, operating means 20 shown in FIG. 1 overlaps the system of coordinates of 45° rotation of the plan view on the system of coordinates of the major axis and minor axis of the ellipse on the projection plane, and obtains a projection view by operating by multiplying by the ratio a/b of the major axis (a) and minor axis (b) in the major axis direction and minor axis direction, and thus obtained projection view is matched with the plane standard point on the plan view at the display standard point, and the cubic view is displayed so that the direction on the plan view may coincide with the direction of the model projection plane.

As for the direction on the model projection plane, when the initially set direction is determined automatically when the specific surface of the model projection plane is designated, the operating procedure can be saved.

The model projection planes are displayed in rotation about at least one of the basic three axes for composing the model projection planes. Hence, the model projection planes corresponding to the inclination of the plan view to be projected can be displayed.

Alternatively, by displaying a plural sets of the model projection planes, and setting the basic three axes at mutually different angles, it may be designed to cope with inclination angles of plural plan views at the same time.

DETAILED DESCRIPTION OF THE INVENTION

[Embodiment 1]

Figure 2:
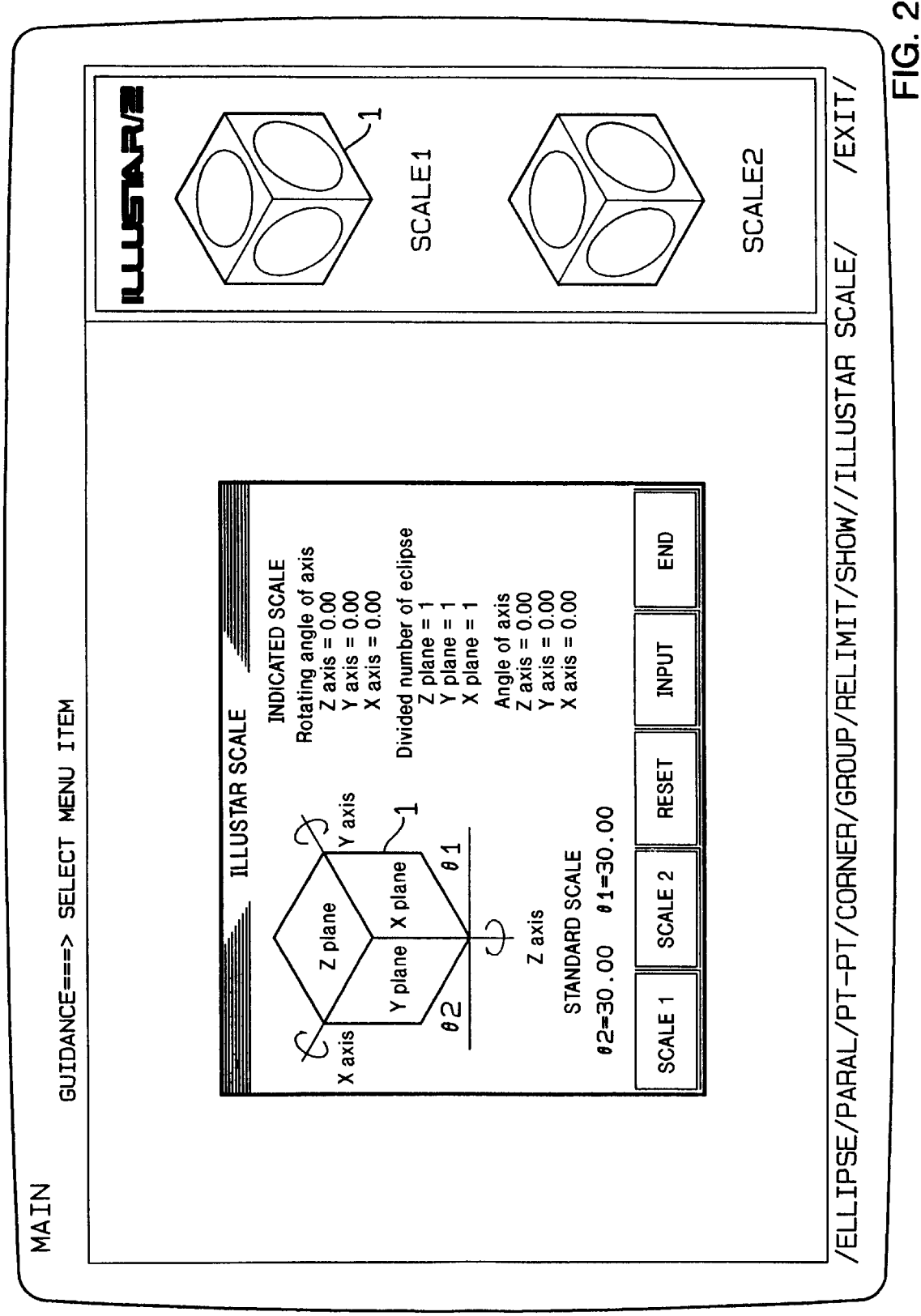
FIG. 2 is a conceptual diagram of an input screen of model projection planes and their projection angles.

First, a model projection drawing 1 by an isometric projection drawing method is shown on a display as shown in FIG. 2.

This model projection drawing 1 can be rotated about the x-axis, y-axis, or z-axis, and this point is described later, and herein the x-axis, y-axis, and z-axis are supposed to be facing the isometric direction. At this time, as shown in FIG. 1, in a specified area of memory means 10, the ratio of major axis and minor axis of the ellipse in the isometric drawing is written individually for X, Y, and Z planes.

In this case, supposing the length of the major axis to be 1, the ratio of the minor axis/major axis is $1/\sqrt{2}$, and the minor axis direction is multiplied by the contraction rate of $1/\sqrt{2}$. To the contrary, supposing the minor axis to be 1, the ratio of the major axis/minor axis is $\sqrt{3}$, and hence the major axis direction is multiplied by the enlargement rate of $\sqrt{3}$.

Figure 1:
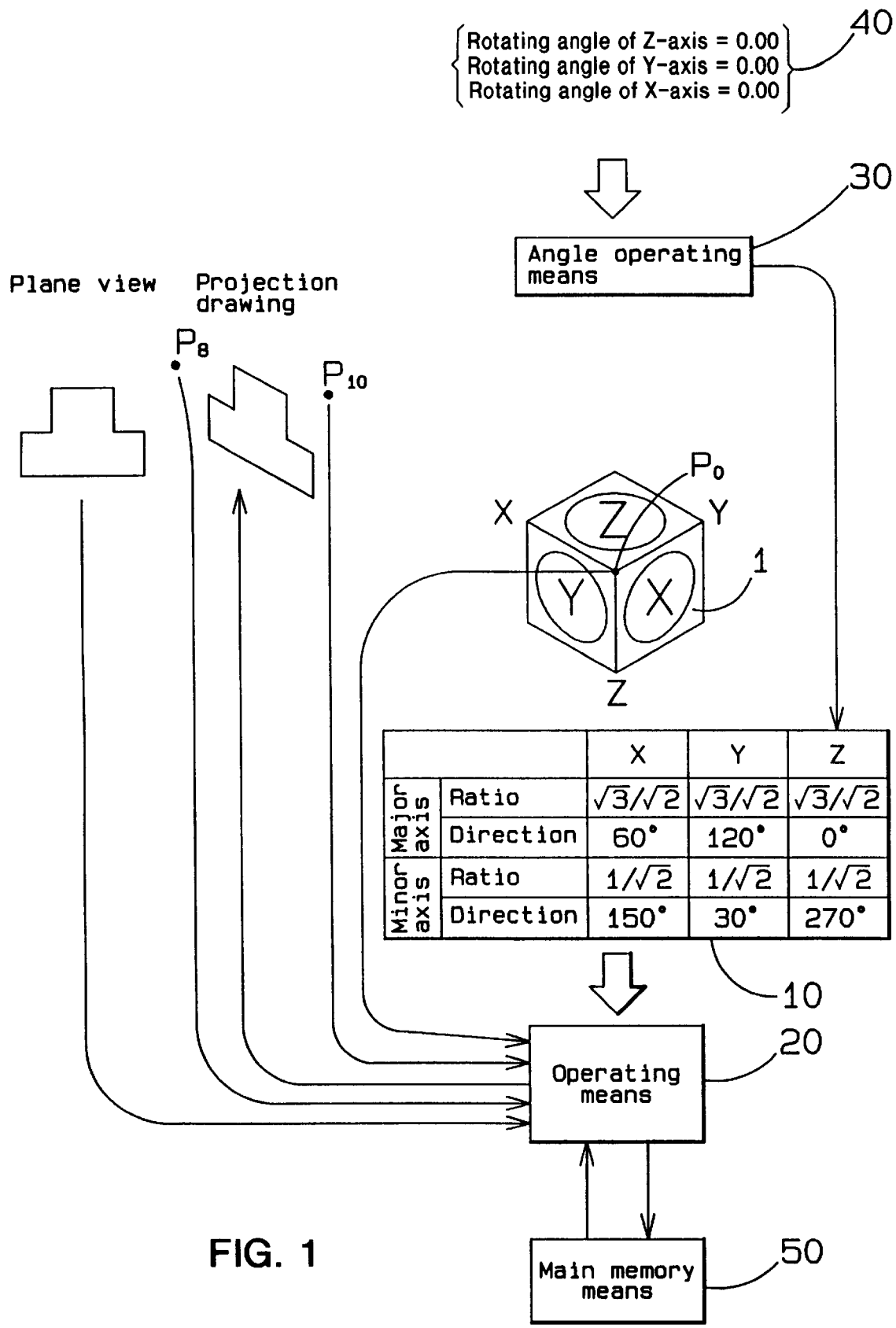
FIG. 1 is a conceptual diagram showing the principle of the invention.

In FIG. 1, however, the length in the isometric standard direction (each axial direction of x, y, z) is supposed to be 1, and it shows an example of enlarging by $\sqrt{3}/\sqrt{2}$ in the major axis direction, and contracting by $1/\sqrt{2}$ in the minor axis direction.

Figure 3:
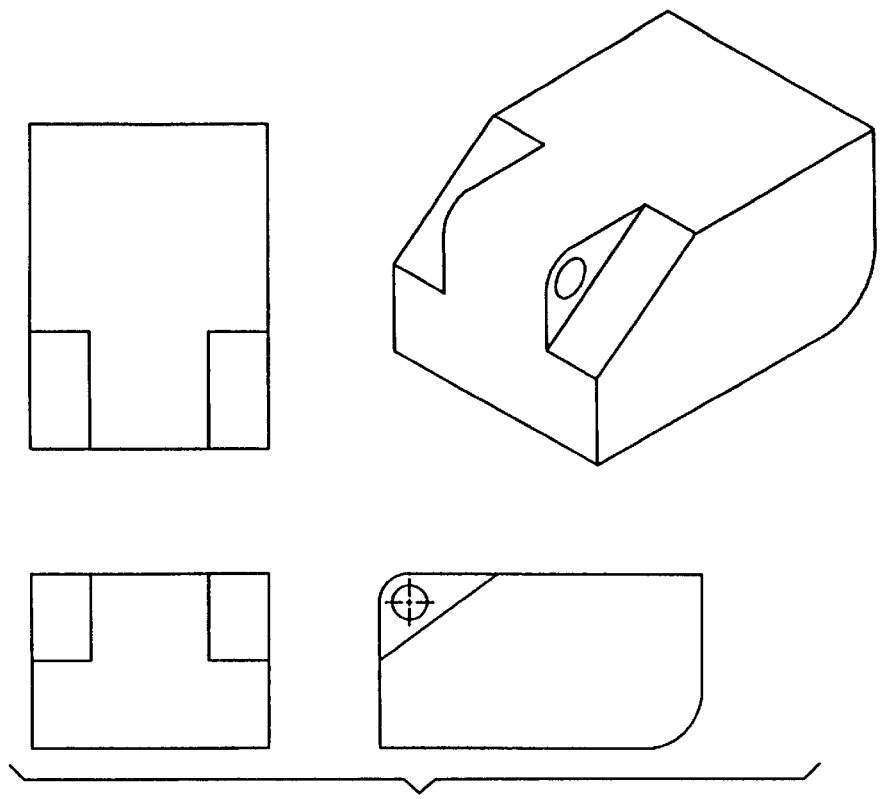
FIG. 3 is a conceptual diagram showing the relation of plan views and a cubic view of the invention.
Figure 4A:
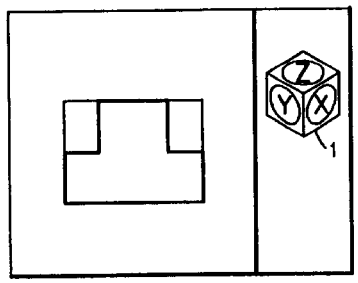
FIG. 4 is a flowchart showing the procedure of drawing a cubic view from plan views shown in FIG. 3.
Figure 4E:
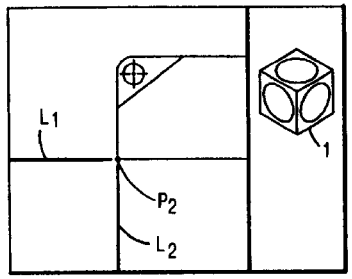
Figure 4I:
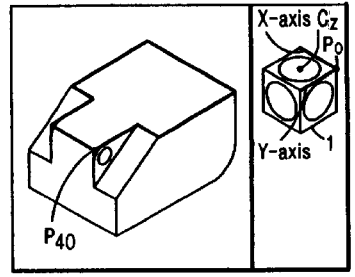
Figure 4B:
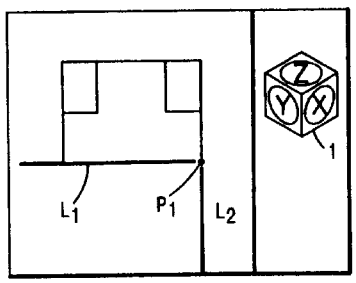
Figure 4F:
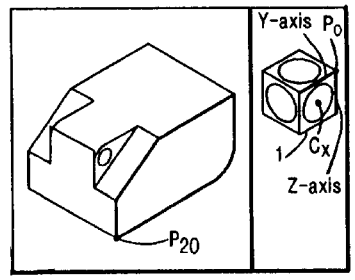

In such state, an actual example of drawing a cubic view in FIG. 3(b) from plan views in FIG. 3(a) is described. First is designated a group of straight lines corresponding to the foremost surface of the front view in the plan views shown in FIG. 4(a) (as a result, for example, the designated group of straight lines is indicated by a color different from other lines or in a lightness different from other lines, and in the following example, it is explained that the lightness is heightened). Consequently, as shown in FIG. 4(b), the plane standard point P1 on the front view is designated by the cursor. In consequence, the operating means 20 acquires the elements for composing the plan view, that is, the data such as a start end of line segment, length direction, size of circle and others, from main memory means 50 storing the data. At this time, the cursor appears in an inverted L form, and by the direction of the inverted L form, as described below, the direction of the drawing is also indicated.

Figure 4J:
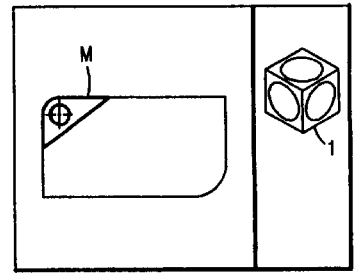
Figure 4C:
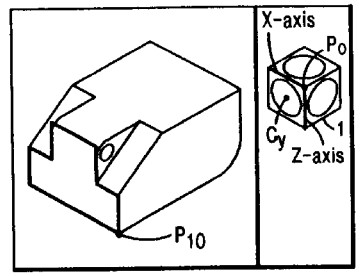

Successively, a specific plane (in this case, Y plane Cx) of the model projection drawing 1 is also designated (FIG. 4(c)), and further the display standard point P10 is indicated as the standard so that the designated plan view may be displayed in the state projected on the specific plane of the projection drawing as mentioned above. As a result, it is instructed that the designated plan view be adhered to the Y plane of the projection drawing, and hence the operating means 20 acquires data necessary for calculation, such as the ratio corresponding to the designated plane from the memory means 10 storing the ratio as described above. At this time, the standard point (projection standard point) P0 on the cubic view is initially set at the right shoulder corner of Y plane, and the meaning of this projection standard point is explained later In this state, on this plan view, the operating means 20 operates by multiplying by the ratio to obtain the projection drawing corresponding to the plan view, and the corresponding position of the standard point P1 on the projection drawing is displayed in coincidence with the display standard point P10 (FIG. 4(c)), and thus obtained data relating to the projection drawing is stored in a specified region in the main memory means 50.

The problem here is the direction of gluing the front view to the Y plane, and two axes (herein x-axis and z-axis) having the apex on standard point P0 on the cubic view when displaying the Y plane corresponding to the direction of bottom L1 and base L2 of the L-shaped cursor appearing when the plane standard point P1 on the plan view is instructed appear as a change of color or lightness. Then, in a state of conversion from a plan view to a cubic view, the plan view is disposed so that the direction of bottom L1 and direction of x-axis, and direction of base L2 and direction of z-axis may coincide with each other.

Figure 4G:
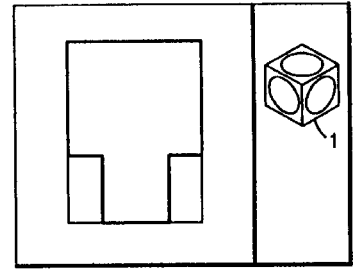
Figure 4K:
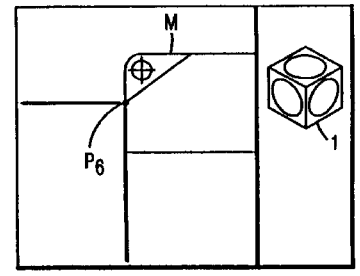
Figure 4D:
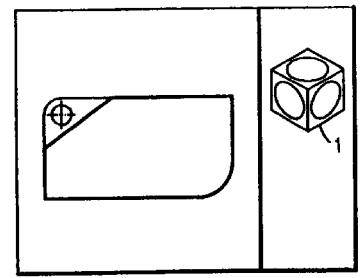

Similarly, as shown in FIG. 4(d), of the elements for composing the right side view, the element of the foremost plane is designated, and the plane standard point P2 and projection plane (in this case, X plane Cx), and display standard point P20 are designated. At this time, the projection standard point P0 is set automatically at the right shoulder of the X plane by designating the X plane of the model projection plane 1. With the projection standard point P0 as the apex, the lightness of the y-axis and z-axis becomes high, and the right side view is projected in the coinciding direction of the bottom L1 direction and y-axis direction, and base L2 direction and z-axis direction at the time of L of the cursor shown in FIG. 4(e).

Moreover, the display standard point P20 is designated, and the display standard point P20 at this time is the point that should be present on the cubic view, and it is easy to understand for drawing to select the point present on the projection drawing corresponding to the front view drawn already on the Y plane. In this case, it is the point corresponding to the lower right corner of the front view, and the same point as the display standard point P10 on the front view is taken (FIG. 4(d) to (e) to (f)).

When the above procedure is over, the same operation as above is calculated in the operating means, and the desired projection drawing is obtained, and displayed so that the plane standard point P2 and display standard point P20 may coincide with each other.

Figure 4H:
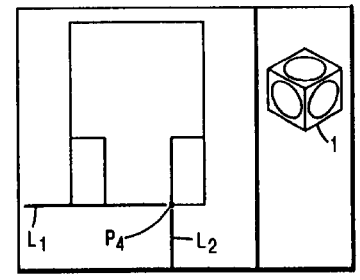
Figure 4L:
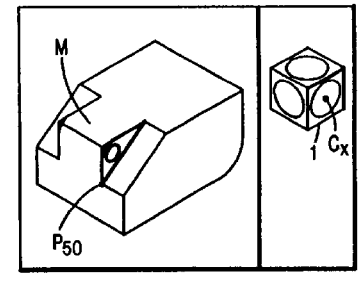

In this procedure, all elements on the stop view are designated, and the plane standard point P4 and projection plane (in this case, Z plane Cz), and display standard point P40 are specified. At this time, the projection standard point P0 is set automatically to the right shoulder on the Z plane by designating the Z plane of the model projection plane 1. With the projection standard point P0 as the apex, the lightness of the x-axis and y-axis becomes high, and the top view is projected in the coinciding direction of the bottom L1 direction and x-axis direction, and base L2 direction and y-axis direction at the time of L of the cursor shown in FIG. 4(h).

Moreover, as the display standard point P40 at this time, the nearest corner on the cubic view is designated. When this procedure is over, then same operation is calculated by the operating means 20, and the desired projection drawing is obtained and displayed so that the plane standard point P4 and display standard point P40 may coincide with each other (FIG. 4(g) to (h) to (i)).

Figure 5M:
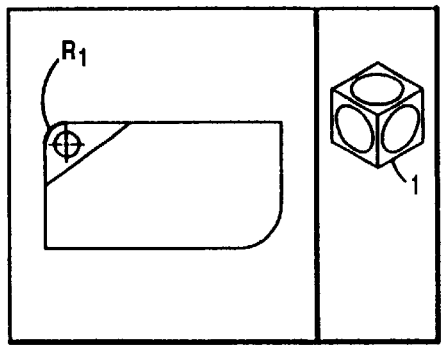
FIG. 5 is a flowchart showing the procedure of drawing a cubic view from plan views shown in FIG. 3.
Figure 5Q:
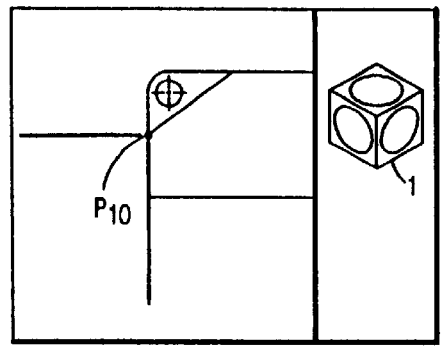
Figure 5N:
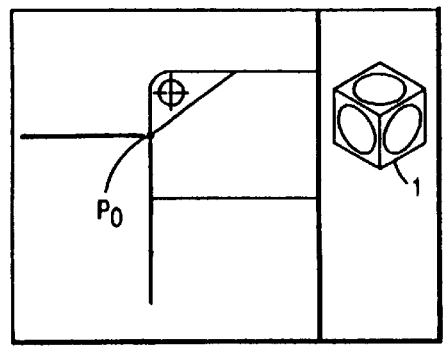
Figure 5R:
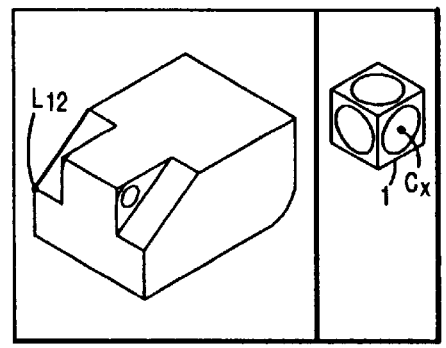
Figure 5O:
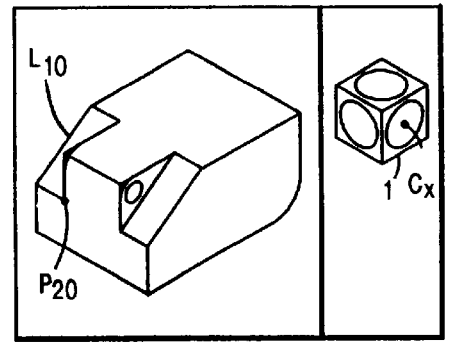
Figure 5S:
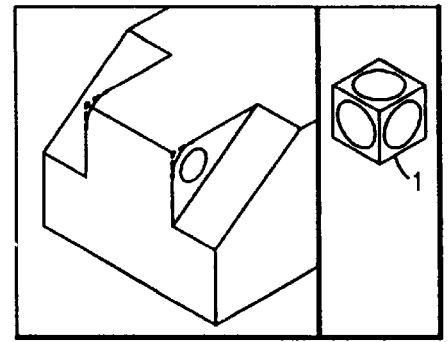
Figure 5P:
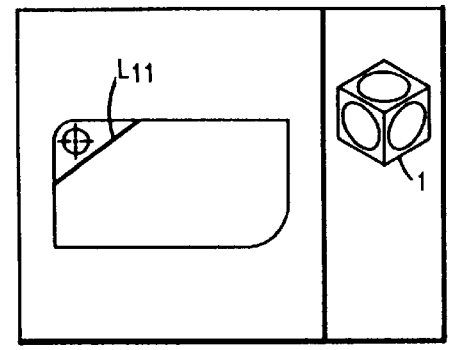
Figure 5T:
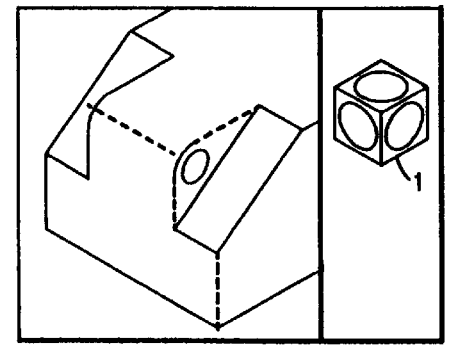

In succession, the right side view appears, and by designating all elements for composing a mounting hole M located at an inner position from the foremost plane of the right side view, projecting on a specified position (plane standard point P6, display standard point P60) (FIG. 4(j) to (k) to (l)), and further designating only the corner R1 of the right side view of the mounting hole M, the plane standard point P8 on the plan view is matched with the standard point P80 on the cubic view, and the corner R1 is projected on the cubic view (FIG. 5(m) to (n) to (o)). Afterwards, oblique line L11 on the plan view is drawn as oblique line L12 on the cubic view (this is merely to draw a straight line L12) (FIG. 5(p) to (q) to (r)), or an unnecessary portion is erased, so that the cubic view is completed (FIG. 5 (s) to (t)).

[Embodiment 2]

Figure 6:
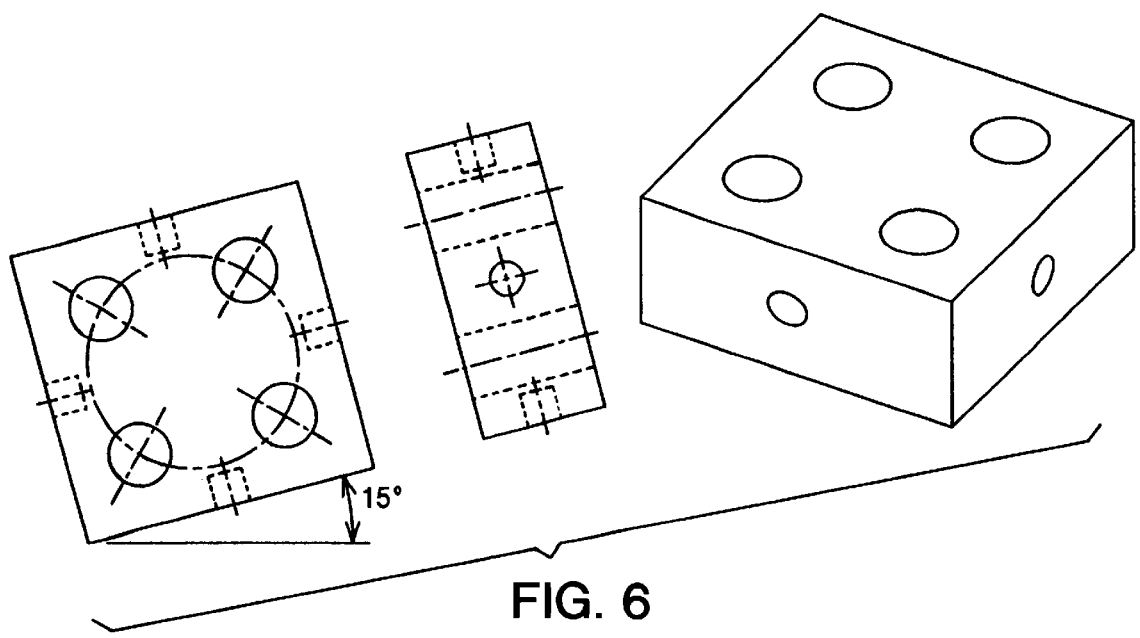
FIG. 6 is another conceptual diagram showing the relation of plan views and a cubic view.

Referring then to an example of drawing a cubic view in FIG. 6(b) from plan views in FIG. 6(a), projection processing at another angle than isometric is described.

From the top view in FIG. 6(a), it is known that this drawing is rotated 15° from the ordinary plan view. In this invention, as shown in FIG. 2, at the first step of the procedure, an angle input screen 40 appears for input of an angle of rotation, together with model projection planes 1. When the operator designates to rotate the specified standard axis (in this case, z-axis) by 15°, angle operating means 30 shown in FIG. 1 calculates the ratio of the major axis and minor axis on each plane and length of a standard line (ratio supposing the isometric direction to be 1) according to the instruction, results are written into the memory means 10, and the drawing is rotated by 15° about the z-axis, and a model projection plane appears with each standard line having the length of a side calculated at the obtained ratio (see FIG. 7).

In this state, first all elements on the top view are designated, and the plane standard point P101 on the plan view is designated same as above. In succession, when line Ld as the standard for coinciding the direction of the drawing and the direction of the cursor is designated, the axis of ordinates L2 of the cursor coincides with the standard line Ld (this function is presented by the CAD system in which this invention is applied). In this state, when the projection plane (Z plane) and display standard point P110 are designated, a projection drawing of the top view on the Z plane is obtained (FIG. 7(a) to (b) to (c)). Still more, also herein, the standard point P0 on the cubic view is initially set at the right end corner of the Z plane, and the lightness of the x-axis and y-axis varies with the standard point P0 as the apex. Therefore, the direction of the projection drawing appears so that the bottom L1 of the L-shaped cursor may coincide with the x-axis direction, and the base L2 with the y-axis direction.

Figure 7A:
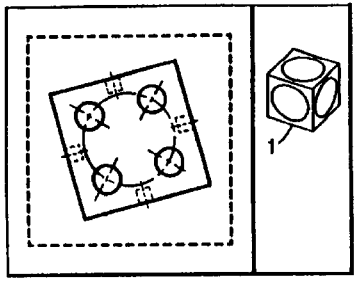
FIG. 7 is a flowchart showing the procedure of drawing the cubic view in FIG. 6.
Figure 7E:
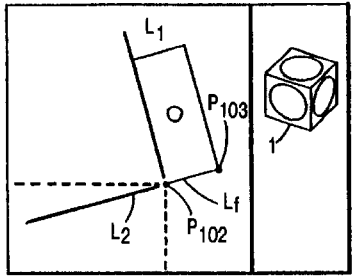
Figure 7I:
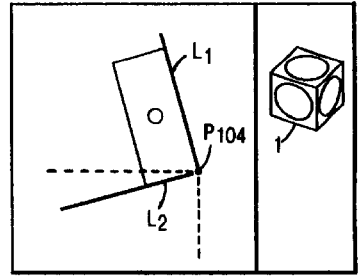
Figure 7B:
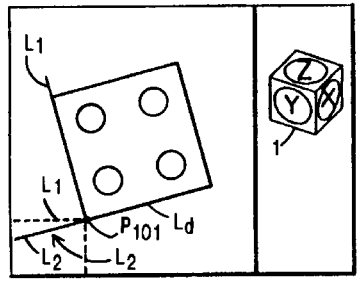
Figure 7F:
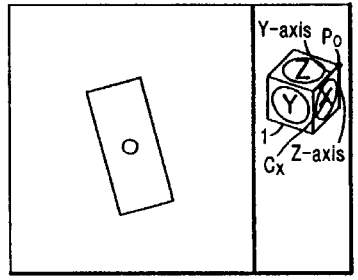
Figure 7J:
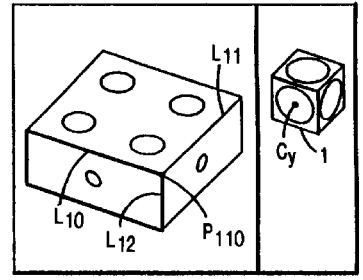
Figure 7C:
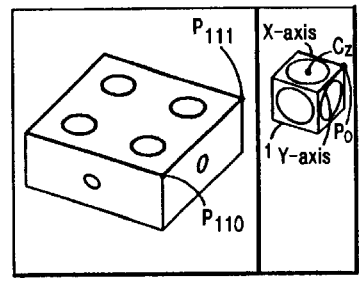
Figure 7G:
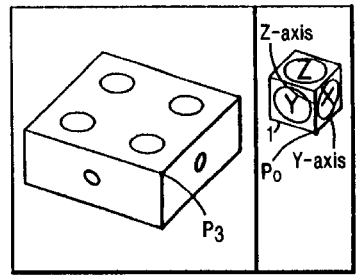
Figure 7K:
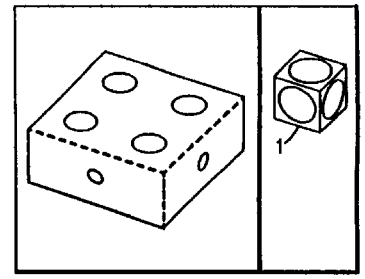
Figure 7D:
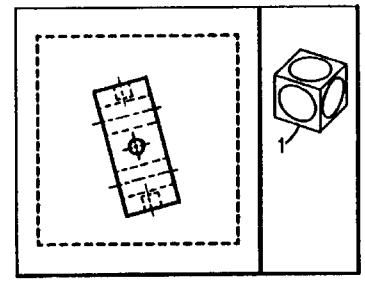
Figure 7H:
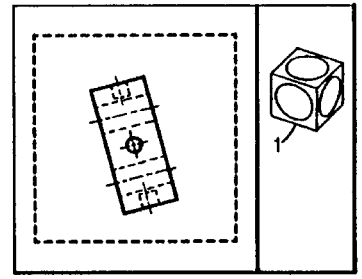

Consequently, by designating the elements for composing the side view, designating the plane standard point P102, and rotating the cursor (matching straight line Lf with L-shaped base L2 of the cursor), the lower line of the side view and the bottom L1 of the cursor are matched, and further the X plane Cx of the model projection plane is designated (FIG. 7(d) to (e) to (f)).

Herein, the projection standard point P0 of the X plane is the right shoulder, and when the projection is instructed in this state, the bottom L1 of the L-shaped cursor coincides with the y-axis direction, the base L2 with the z-axis direction, and thereby the plane standard point P102 is located at the point P111 of the right upper shoulder shown in FIG. 7(c), which is inconvenient.

In this case, when projected on the X plane, the plane standard point P102 on the side view should coincide with the display standard point P110 shown in FIG. 7(c).

Accordingly, by making use of the fact that the side views are symmetrical both vertically and laterally, the following processing is done. That is, after designating the plane standard point P102 as stated above, the X plane is designated. Then, by designating the point Pc of the lower left angle of the X plane, the lightness of the y-axis and z-axis varies with the Pc at the apex. As a result, the direction of the bottom L1 of the L-shaped cursor is designated to be inclined to the y-axis direction, and the direction of the base L2 to the z-axis direction. In this state, further, the lower left angle of the plan view (appearing before the middle in the projection drawing) P110 already projected as the display standard point is designated. As a result, the plane standard point P102 on the plan view is overlapped with the display standard point P110 (FIG. 7(d) to (e) to (f) to (g)).

Incidentally, with the lower right point P103 of the plan view as the reference point on the plan view, the initially set projection standard point P0 can be directly used as the display standard point, and the display standard point as the right shoulder point P111 of the projected plan view, so that the same results as above can be obtained.

The drawing on the plan view to be projected on the Y plane is a front view, and making use of the fact that the front view and right side view are identical, the entire right side view is designated again. Next, as the plane standard point, point 104 at the lower right corner is designated, and the Y plane of the model projection plane is designated, and the display standard point P110 corresponding to the lower right corner of the already projected to view is designated, so that the desired projection drawing is plotted (FIG. 7(h) to (i) to (j)). When processed in this procedure, the lines L10, L11, L11, L12 are overlapped by two each, and they are erased to be one line each (FIG. 7(h)).

This embodiment shows that the angle of the model projection planes can be freely changed, and also that the cubic view can be drawn only from a plan view and one side view, and it means that a cubic view can be drawn even from incomplete plan views (if all six planes are not available).

Figure 8A:
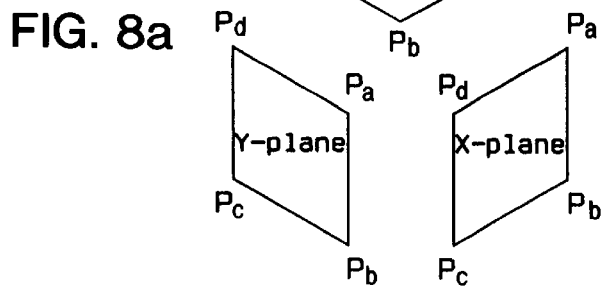
FIG. 8 is a conceptual diagram showing the relation of direction of a plan view and direction of a cubic view.
Figure 8B:
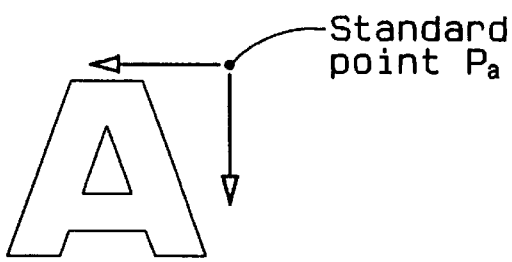
Figure 8C:
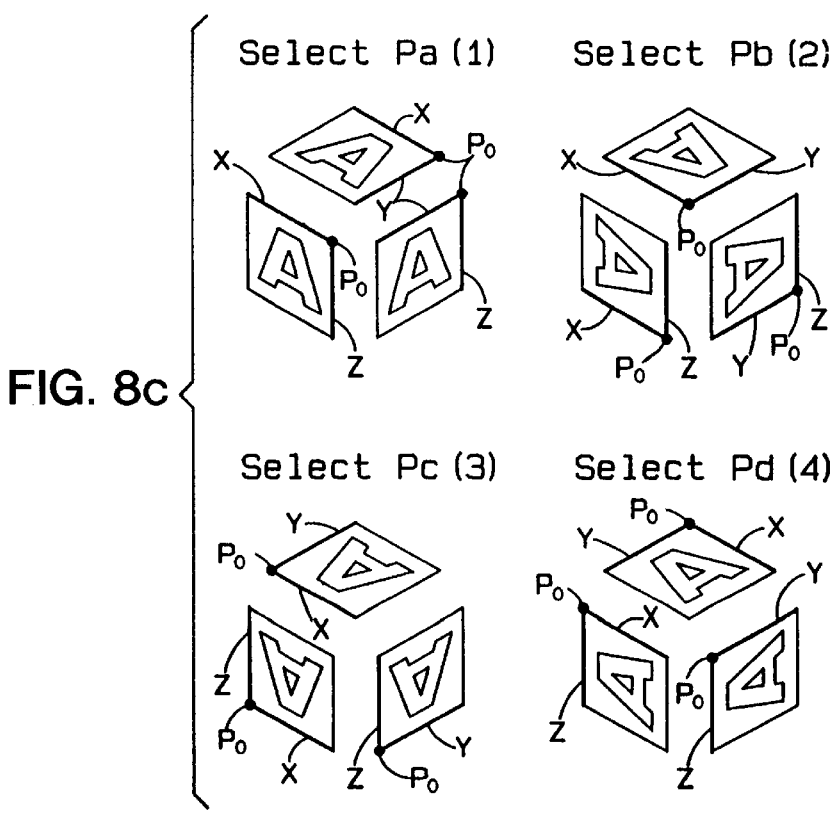
Figure 9A:
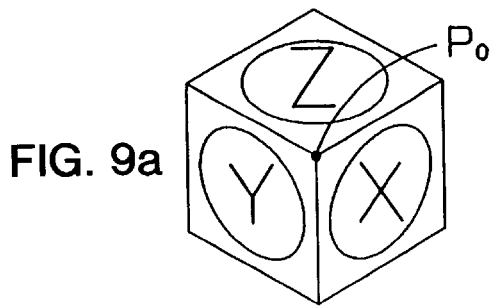
FIG. 9 is a conceptual diagram showing basic pipe diameters of plan views and a cubic view.
Figure 9C:
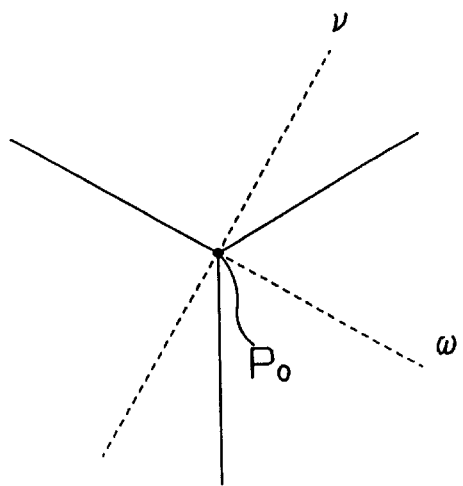
Figure 9B:
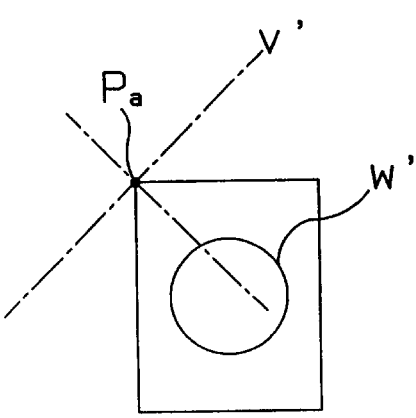
Figure 9D:
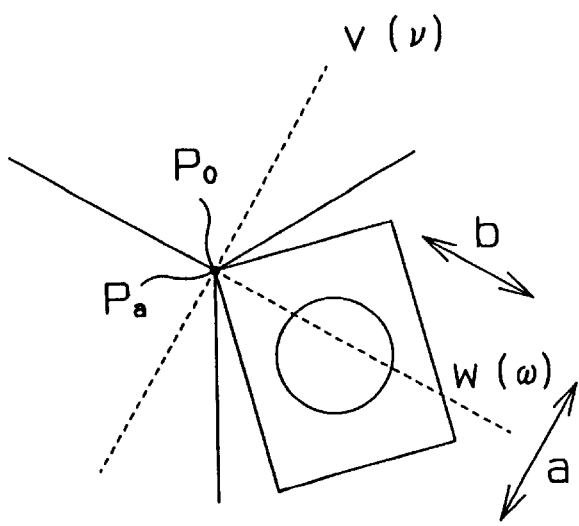
Figure 9E:
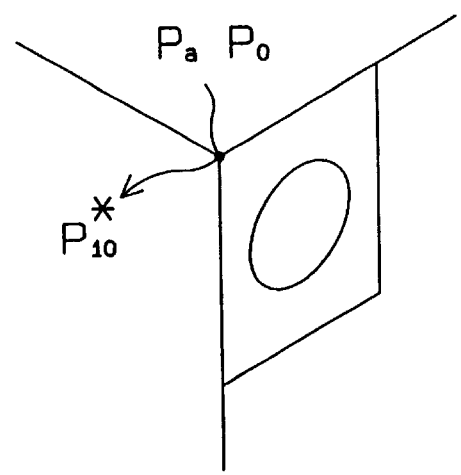
Figure 10A:
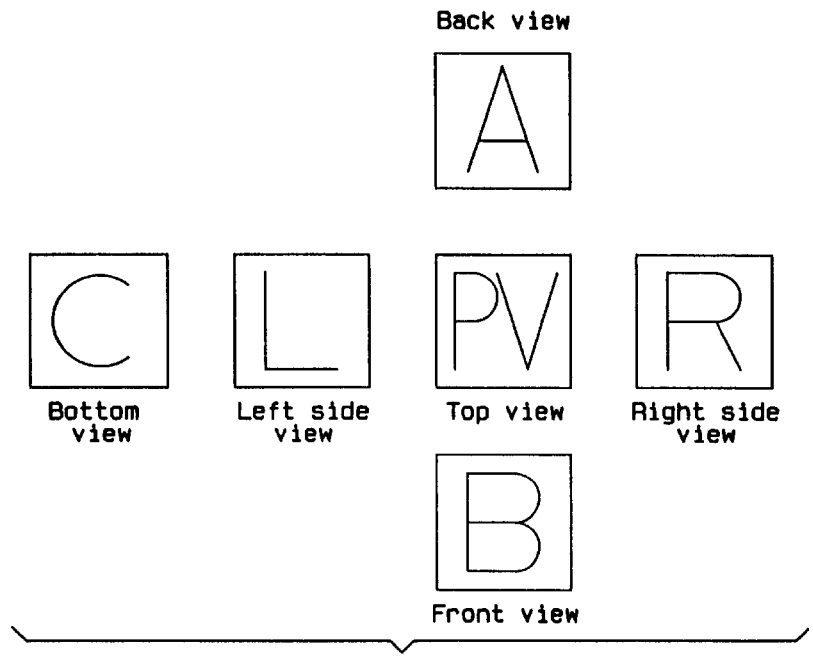
FIG. 10 is a conceptual diagram of a prior art.
Figure 10B:
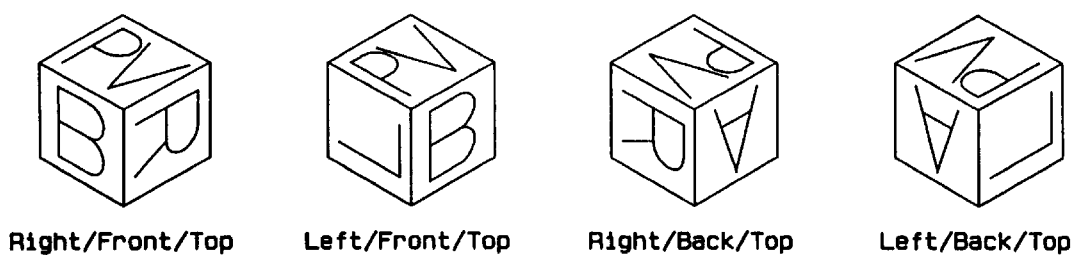
Figure 10B:
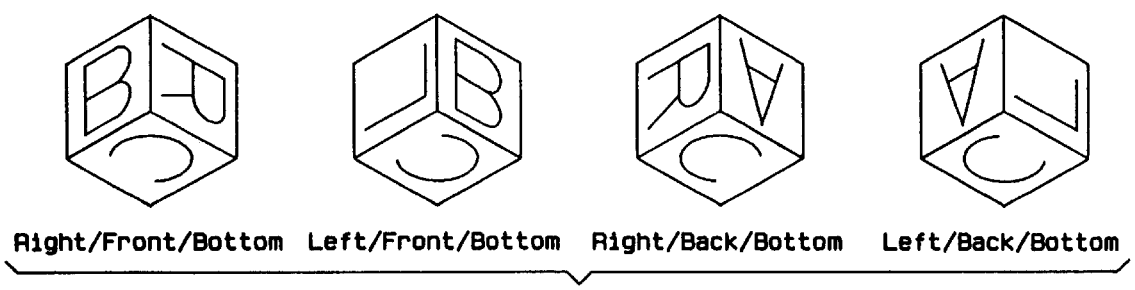
Figure 11A:
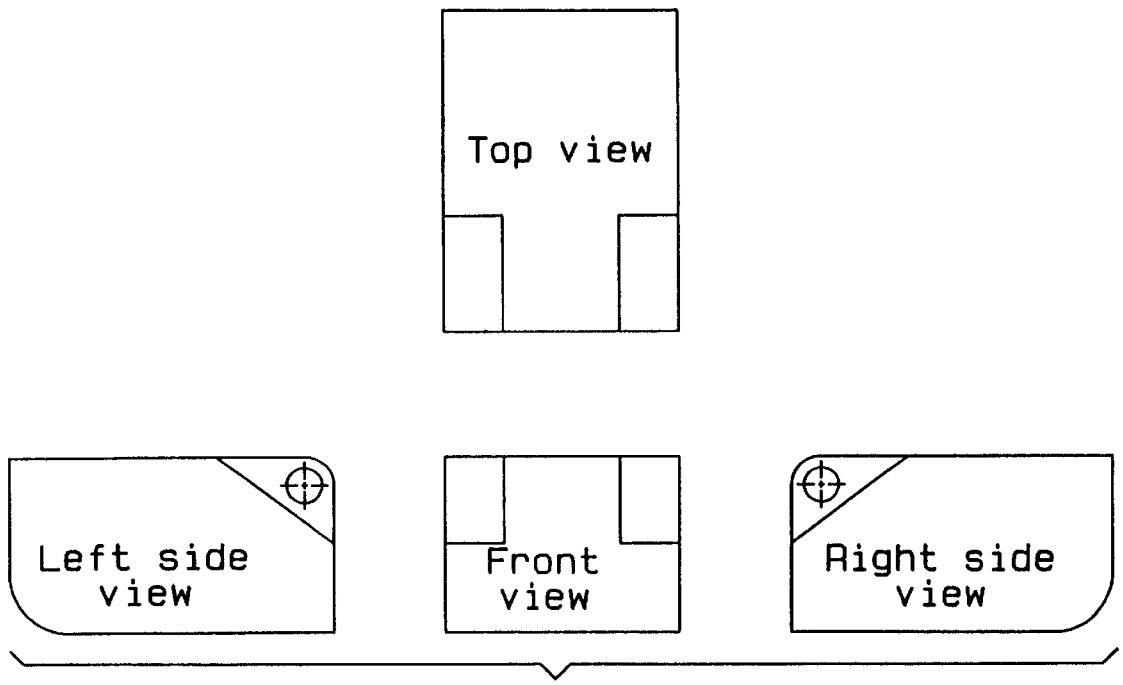
FIG. 11 is a flowchart showing the procedure of drawing a cubic view by prior art.
Figure 11B:
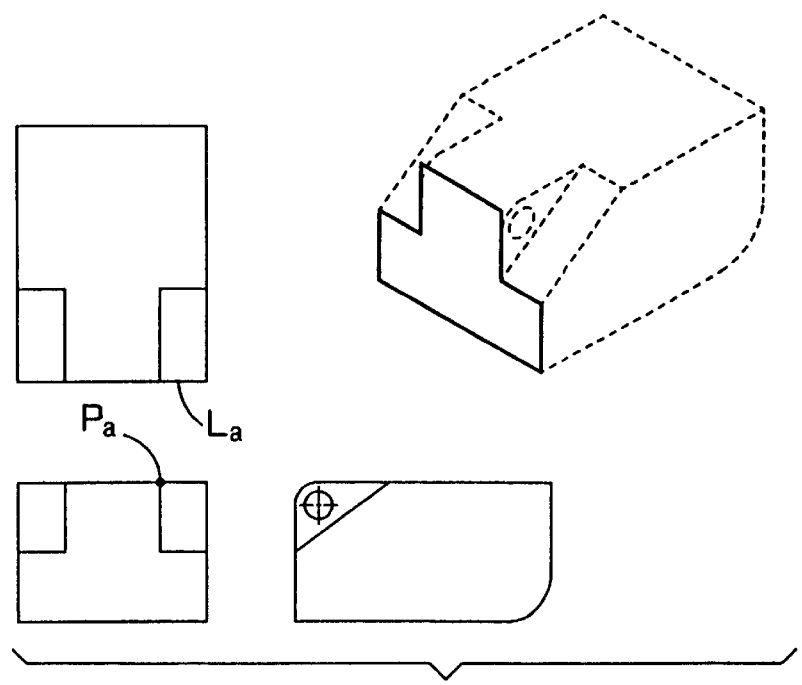
Figure 12C:
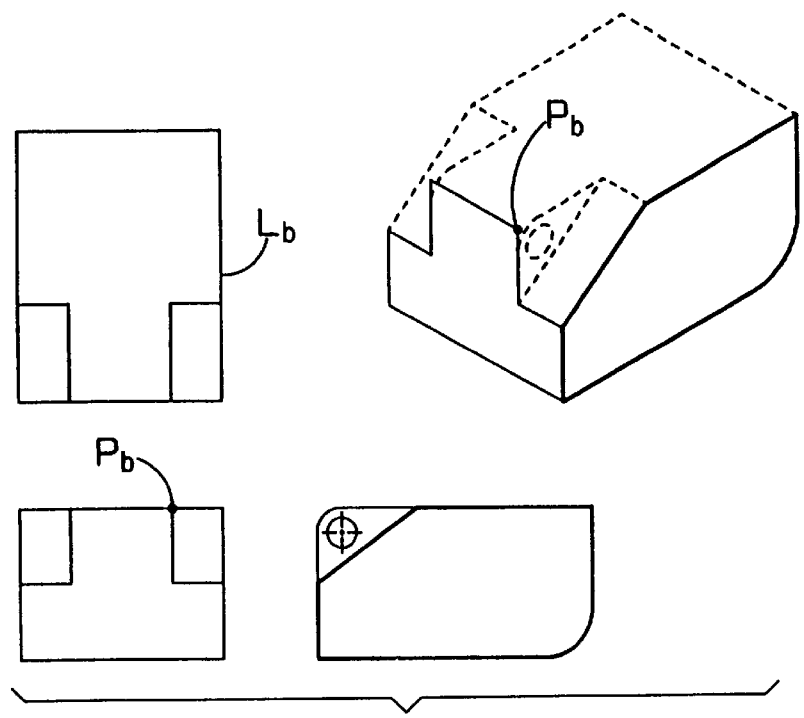
FIG. 12 is a flowchart showing the procedure of drawing a cubic view by the prior art.
Figure 12D:
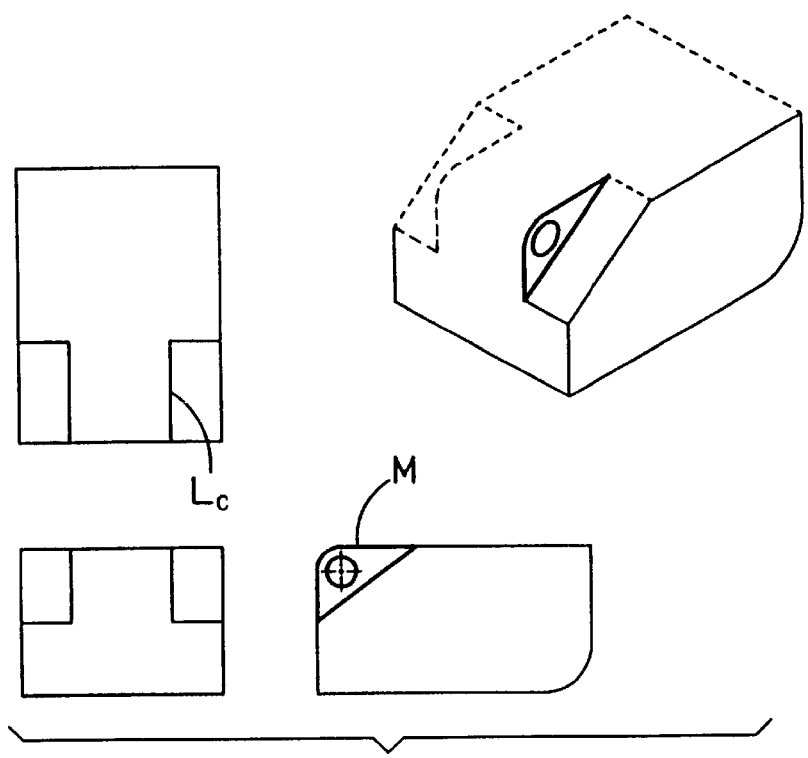

FIG. 8 shows a mode of initial setting of standard points Pa to Pd on the cubic view. That is, the corners of the planes for composing the cubic view are preliminarily related as shown in FIG. 8(a). In this state, for example, when point Pa is selected, each corner indicated by thick lines 1 to 4 in FIG. 8(c) becomes the standard point P0 on the cubic view, and two sides enclosing each corner (combination of two axis out of x, y, z axes) coincide with two sides L20, L21 of the cursor shown in the plan view in FIG. 8(b), and the projection standard point P0 is projected to coincide with the plane standard point Ps at the apex of the two sides on the plan view. Or, in the case the elements shown in FIG. 3 and the elements shown in FIG. 6 coexist on one plan view, for example, elements drawn on one plan view may not be drawn into a cubic view by using only the model projection plane of the angle corresponding to the isometric angle, and therefore by using two or more model projection planes, the standard axes (X, Y, Z) of both model projection planes can be rotated at different angles.

As described herein, in the invention, by displaying model projection planes as shown in FIG. 2, it is possible to instruct visually to project the objective plan view on which plane, and hence it is effective to promote the work while imaging a completed drawing.

What is claimed is:

1. A method of drawing a cubic view by displaying three model projection planes for composing a cubic view on a display, specifying a plan view to be projected, designating a plane standard point and a direction of the drawing with respect to a projection plane on the specified plan view, instructing a specific plane of the model projection planes and the direction of the drawing with respect to the projection plane on the model projection planes, and further instructing an arbitrary display standard point on the display, wherein a system of coordinates of 45° rotation of the plan view is overlapped with a system of coordinates of a major axis and a minor axis of an ellipse on the projection planes, a projection drawing is obtained by multiplying the major axis direction and minor axis direction by the ratio a/b of the major axis (a) and minor axis (b), the obtained projection drawing is matched with the display standard point at the plane standard point, and the direction on the plan view and the direction of the model projection plane are matched to the displayed.

2. A method of drawing a cubic view of claim 1, wherein the direction on the model projection plane is set initially.

3. A method of drawing a cubic view of claim 1, wherein the model projection planes are rotated and displayed about at least one of the basic three axes for composing the cubic view, depending on the inclination of the plan view to be projected.

4. A method of drawing a cubic view of claim 3, wherein plural sets of model projection planes are displayed, and any one of the three basic axes is set at a mutually different angle.

* * * * *